(12) United States Patent
Capper et al.

(10) Patent No.: US 10,585,725 B2
(45) Date of Patent: Mar. 10, 2020

(54) SYSTEM AND METHOD OF HITLESS RECONFIGURATION OF A DATA PROCESSING PIPELINE

(71) Applicant: Arista Networks, Inc., Santa Clara, CA (US)

(72) Inventors: Simon Francis Capper, San Jose, CA (US); Sebastiano Borgione, Saratoga, CA (US); Navdeep Bhatia, Sunnyvale, CA (US)

(73) Assignee: Arista Networks, Inc., Santa Clara, CA (US)

( * ) Notice: Subject to any disclaimer, the term of this patent is extended or adjusted under 35 U.S.C. 154(b) by 80 days.

(21) Appl. No.: 15/937,799

(22) Filed: Mar. 27, 2018

(65) Prior Publication Data

US 2019/0303220 A1    Oct. 3, 2019

(51) Int. Cl.
*G06F 9/54* (2006.01)
*G06F 9/44* (2018.01)
*G06F 9/38* (2018.01)
*G06F 9/445* (2018.01)

(52) U.S. Cl.
CPC ............. *G06F 9/544* (2013.01); *G06F 9/38* (2013.01); *G06F 9/44505* (2013.01)

(58) Field of Classification Search
CPC ......... G06F 9/544; G06F 9/44505; G06F 9/38
See application file for complete search history.

(56) References Cited

U.S. PATENT DOCUMENTS

| | | | |
|---|---|---|---|
| 8,806,181 B1 | 8/2014 | O'Bleness | |
| 9,819,587 B1 | 11/2017 | Tracy | |
| 9,898,071 B2 | 2/2018 | Williamson | |
| 10,313,495 B1* | 6/2019 | Bosshart | ................ H04L 69/22 |
| 2007/0038939 A1 | 2/2007 | Challen | |
| 2013/0187935 A1 | 7/2013 | Wexler | |
| 2016/0127275 A1 | 5/2016 | Asa | |
| 2017/0099193 A1 | 4/2017 | Mahajan | |
| 2017/0177324 A1 | 6/2017 | Frank | |

(Continued)

FOREIGN PATENT DOCUMENTS

WO    WO2016099984    6/2016

OTHER PUBLICATIONS

Office Action dated Aug. 2, 2019 in U.S. Appl. No. 15/937,801.
International Search Report from PCT/US2019/024389 dated Aug. 6, 2019.

*Primary Examiner* — Stefan Stoynov

(74) *Attorney, Agent, or Firm* — Haley Guiliano LLP

(57) ABSTRACT

A method and apparatus of a network element that processes data by a network element with a data processing pipeline is described. In an exemplary embodiment, the network element prepares a new image for the data processing pipeline of the network element, where the data processing pipeline processes network data received by the network element and the new image modifies one or more functionalities of the data processing pipeline. In addition, the network element puts the data processing pipeline into a non-forwarding mode. Furthermore, the network element writes the new image into memory of the data processing pipeline. The network element additionally puts the data processing pipeline into a forwarding mode, where the data processing pipeline processes network data received by the network element using the new image.

20 Claims, 9 Drawing Sheets

(56) References Cited

U.S. PATENT DOCUMENTS

| | | |
|---|---|---|
| 2018/0210730 A1 | 7/2018 | Sankaralingam |
| 2019/0036839 A1* | 1/2019 | Kaag ..................... H04L 47/803 |
| 2019/0124577 A1* | 4/2019 | Li ....................... H04L 41/0816 |
| 2019/0158428 A1* | 5/2019 | Gray .................... H04L 69/321 |
| 2019/0304047 A1 | 10/2019 | Capper |

* cited by examiner

SYSTEM AND METHOD OF HITLESS RECONFIGURATION OF A DATA PROCESSING PIPELINE

FIELD OF INVENTION

This invention relates generally to data networking, and more particularly, to performing a hitless reconfiguration of a data processing pipeline for a hardware forwarding engine of a network element.

BACKGROUND OF THE INVENTION

A network element can include two different planes that are used to process network traffic: a control plane; and a data plane that includes one or more hardware forwarding engines. The data plane receives, processes, and forwards network traffic using various configuration data (e.g., forwarding, security, quality of service (QoS), and other network traffic processing information). The control plane controls these processing functions of the data plane by configuring the data plane, managing data collected by the data plane, monitoring the data plane, and other management functions. The functions for each of the data and control planes are programmed by a software image, the network element operating system that is stored on the network element.

The data plane includes a data processing pipeline that processes the incoming network data using one or more functionalities of the pipeline. In one embodiment, each of the functionalities can provide a different functionality, such as packet forwarding functionality (routing, switching, or another type of packet forwarding), security functionality (e.g., firewall, network address translation, access control lists, and/or other types of functionalities), QoS, traffic policing, network data re-write, and/or other network traffic processing functionalities. The data processing pipeline is part of hardware and can be an Application-Specific Integrated Circuit (ASIC).

A problem with having a data processing pipeline in hardware is that configuring of the data pipeline processing is performed when the associated hardware for the data processing pipeline is manufactured. Thus, it is impossible to add, delete, modify, or re-order the pipeline functionality with such a fixed ASIC data processing pipeline after the ASIC has been manufactured.

SUMMARY OF THE DESCRIPTION

A method and apparatus of a network element that processes data by a network element with a data processing pipeline is described. In an exemplary embodiment, the network element prepares a new image for the data processing pipeline of the network element, where the data processing pipeline processes network data received by the network element and the new image modifies one or more functionalities of the data processing pipeline. In addition, the network element puts the data processing pipeline into a non-forwarding mode. Furthermore, the network element writes the new image into memory of the data processing pipeline. The network element additionally puts the data processing pipeline into a forwarding mode, where the data processing pipeline processes network data received by the network element using the new image.

In a further embodiment, a network element processes data by a data processing pipeline is described. In one embodiment, the network element prepares a new image for the data processing pipeline of the network element, where the data processing pipeline processes incoming network data received by the network element and the new image modifies a current set of functionalities of the data processing pipeline. The network element further writes the new image into a standby memory of the data processing pipeline, where the network element includes an active memory that programs the current set of functionalities of the data processing pipeline. In addition, the network element programs the data processing pipeline using the new image. The network element additionally processes the incoming network data received by the data processing pipeline using the modified current set of functionalities.

In an additional embodiment, a network element processes data by a data processing pipeline is described. In one embodiment, the network element prepares a new image for a standby data processing pipeline of the network element, where the data processing pipeline includes an active data processing pipeline and the standby data processing pipeline, the active data processing pipeline processes incoming network data currently being received by the network element, and the new image programs a new set of functionalities of the standby data processing pipeline. The network element additionally writes the new image into a standby memory of the data processing pipeline, where the network element includes an active memory that programs the current set of functionalities of the active data processing pipeline. Furthermore, the network element programs the standby data processing pipeline using the new image. In addition, the network element processes the incoming network data received with the standby data processing pipeline using the new set of functionalities.

Other methods and apparatuses are also described.

BRIEF DESCRIPTION OF THE DRAWINGS

The present invention is illustrated by way of example and not limitation in the Figures of the accompanying drawings in which like references indicate similar elements.

DETAILED DESCRIPTION

Figure 1:
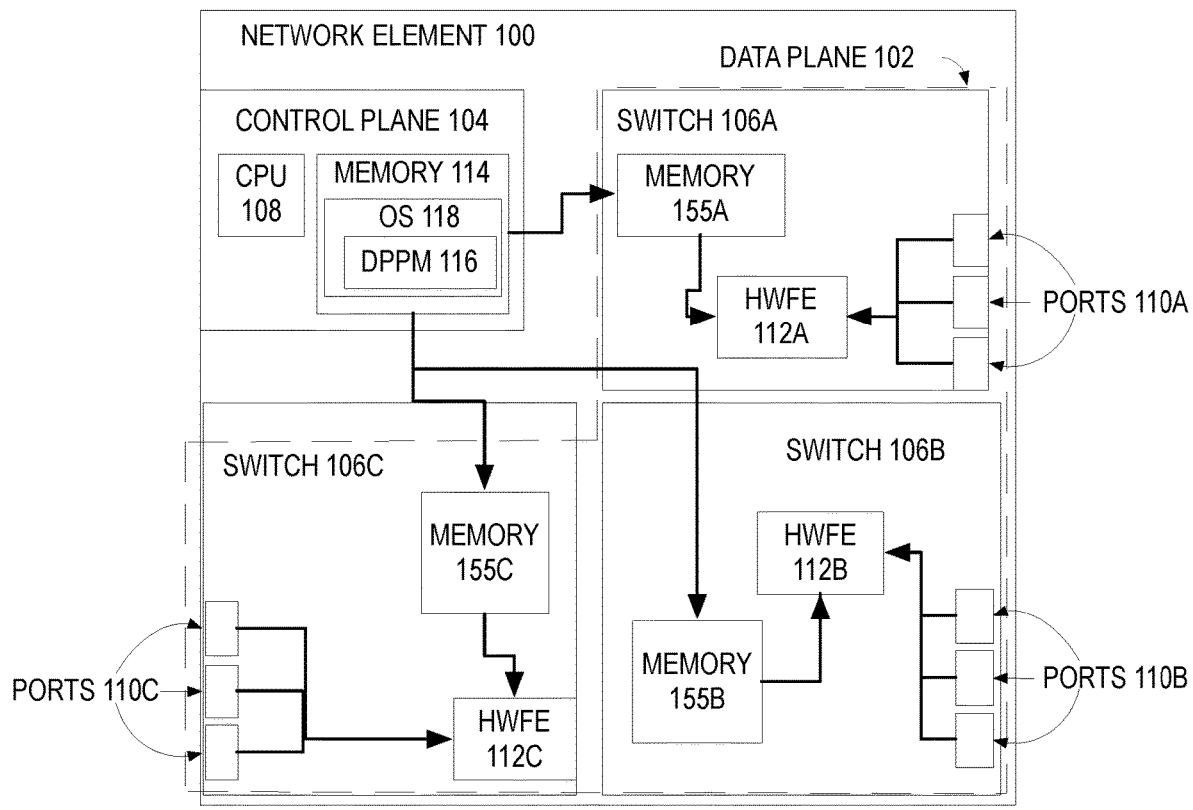
FIG. 1 is a block diagram of one embodiment of a network element that includes a control plane and multiple data planes.

A method and apparatus of a network element that processes data by a network element with a data processing pipeline is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a network element that processes data by a network element with a data processing pipeline is described. In one embodiment, the network element re-programs a data processing pipeline of a data plane hitlessly without restarting the data plane. In one embodiment, the network element can re-program the data processing pipeline after the network element has been manufactured and deployed in a customer environment. In one embodiment, the network element re-programs the data processing pipeline by preparing a new image for the data processing pipeline, where the new image programs the functionality of the data processing pipeline. In this embodiment, the new image can add new functionality, delete existing functionality, re-order existing functionality, and/or modify existing functionality. The network element additionally puts the data processing pipeline in a non-forwarding mode. In one embodiment, a non-forwarding mode for the data processing pipeline does not processing received network data and the network element buffers this data. The network element further writes the new image into memory of the data processing pipeline. With the new image in this memory, the network element has re-programmed data processing pipeline. The network element further puts the data processing pipeline into a forwarding mode, where the data processing pipeline processes network data using the new image.

In a further embodiment, the network element can re-program the functionality of the data processing pipeline without putting the data processing pipeline in a non-forwarding mode. In one embodiment, the network element includes two memory regions that can be used for processing the data processing pipeline. In this embodiment, the network element includes an active memory region that is used to program an actively processing data processing pipeline and a standby memory region that is used to store a new image for the data processing pipeline, where the new image can be used to re-program the data processing pipeline without putting the data processing pipeline into a non-forwarding mode. In another embodiment, the data processing pipeline includes an active data processing pipeline and a standby data processing pipeline. In this embodiment, the active data processing pipeline processes network data received by the network element and is programmed by an active memory region, where the standby data processing pipeline is programmed by the standby memory region. Furthermore, to change the functionalities of the data processing pipeline, the network element re-programs the standby data processing pipeline using a new image in the standby memory region and directs the flow of incoming network data to the standby data processing pipeline. In addition, the standby data processing pipeline becomes the new active data processing pipeline. By directing the network data to newly programmed standby (and now active) data processing pipeline, the network element re-programs the functionalities of the data processing pipeline with little or no downtime.

FIG. 1 is a block diagram of one embodiment of a network element 100 that includes a control plane 104 and a data plane 102. In one embodiment, the data plane 102 receives, processes, and forwards network data using various configuration data (e.g. packet forwarding (routing, switching, or another type of packet forwarding), security, quality of service (QoS), and other network traffic processing information). For example, for each received packet of the network traffic, the data plane determines a destination address of that packet, looks up the requisite information for that destination in one or more memories 120A-C of data plane, and forwards the packet out the proper outgoing interface. The data plane 102 includes multiple switches 106A-C that can each receive, process, and/or forward network traffic. In one embodiment, each switch 106A-C includes a hardware forwarding engine 112A-C and ports 110A-C, respectively. In one embodiment, the network element 100 can be a switch, router, hub, bridge, gateway, etc., or any type of device that can communicate data packets with a network. In one embodiment, the network elements 100 can be a virtual machine.

In one embodiment, the control plane 104 includes central processing unit (CPU) 108. As discussed herein, CPU 108 is interchangeably referred to as a control plane processor of network element 100. The CPU 108 is used to process information for the control plane 104 and write configuration data for hardware forwarding engines 112A-C in the switches 106A-C. The information processed by CPU 108 includes, for example, control plane data corresponding to a plurality of different classes of control plane traffic, such as routing protocol messages, routing table messages, routing decisions messages, route update messages, unresolved traffic messages, L2 protocol messages, link aggregation control protocol messages, link layer state updates messages (e.g., spanning tree messages), link state update messages (e.g., link aggregation control protocol messages for a link aggregation group, bidirectional forwarding detection messages, etc.), exception packets that cannot be dealt with in hardware (e.g., router alerts, transmission time interval messages, maximum transmission size exceeded messages, etc.), program messages (e.g., packets from a controller instructing the programming of a network element), messages for routing table misses, time control messages (e.g., precision time protocol messages), messages for packets marked as being of interest for snooping (e.g., access control list logging and port mirroring messages), messages used to collect traffic diagnostics, address resolution messages (ARP) requests and replies, neighbor solicitation requests and replies, general communication to the control plane of the networking device, etc. CPU 108 processes the control plane network data to perform control management updates and/or respond with control message responses (e.g., routing decisions, protocol updates, traffic resolutions, etc.).

In one embodiment, the control plane 108 further includes memory 114 that includes operating system 118 that is executing various processes. In this embodiment, the processes are processes that execute the functionality of the control plane 104. In one embodiment, there can be processes for quality of service, access control lists management (or other types of security), policy service, fan agent, light emitting diode agent, temperature sensor agent, database service, management service(s), processes to support networking protocols (e.g. spanning tree protocol (STP), routing protocols (e.g. such as routing information protocol (RIP), border gateway protocol (BGP), open shortest path first (OSPF), intermediate system-intermediate system (IS-IS), interior gateway routing protocol (IGRP), enhanced IGRP (EIGRP), protocol independent multicast (PIM), distance vector multicast routing protocol (DVMRP), and any/or other type or unicast or multicast routing protocol), Multiprotocol Label Switching (MPLS), and/or other types of networking protocols), network flow management applications (e.g., openflow, directflow), process manager, and/or other types of processes for other types of functionality of the network element 100. In one embodiment, the operating system includes a data processing pipeline module 116 that controls the re-programming of the data processing pipeline described below. In one embodiment, the data processing pipeline module 116 can re-program the data processing pipeline by putting the data processing pipeline in a non-forwarding mode, using a standby memory, and/or using a standby data processing pipeline.

In one embodiment, the data plane 102 receives, processes, and forwards network data, including control plane network data, using various configuration data (e.g., forwarding, security, quality of service (QoS), and other network traffic processing information). The data plane 102 includes multiple switches 106A-C that can each receive, process, and/or forward network traffic. Each of the switches 106A-C includes multiple ports 110A-C that are used to receive and transmit network data.

In one embodiment, for each received unit of network data (e.g., a packet), the data plane 102 determines a destination address for the network data, looks up the requisite information for that destination in one or more tables stored in the data plane, and forwards the data out the proper outgoing interface, for example, one of the interface devices 106A-C. In one embodiment, each switch 106A-C includes one or more hardware forwarding engines (HWFE(s)) 112A-C and ports 110A-C, respectively. Each hardware forwarding engine 112A-C forwards data for the network element 100, such as performing routing, switching, or other types of network forwarding or processing.

Figure 2:
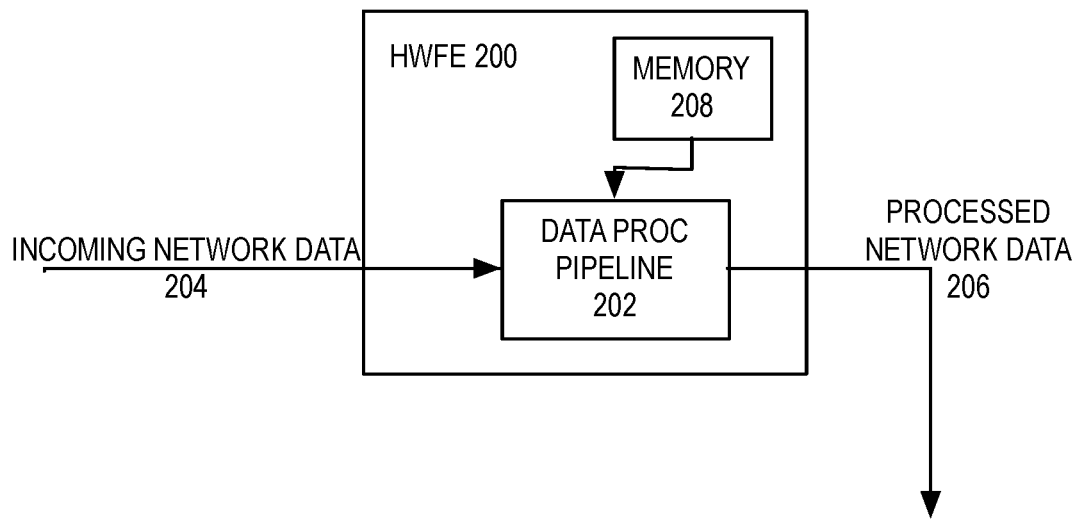
FIG. 2 is a block diagram of one embodiment of a hardware forwarding engine that includes a data processing pipeline.

FIG. 2 is a block diagram of one embodiment of a hardware forwarding engine 200 that includes a data processing pipeline 202 and memory 208. In one embodiment, the hardware forwarding engine 200 receives incoming network data 204, processes the incoming network data 204 using data processing pipeline 202, and outputs the processed network data 206. In this embodiment, the data processing pipeline 202 processes the incoming network data using one or more functionalities of the pipeline. In one embodiment, each of the functionalities can provide a different functionality, such as packet forwarding functionality (routing, switching, or another type of packet forwarding), security functionality (e.g., firewall, network address translation, access control lists, and/or other types of functionalities), QoS, traffic policing, network data re-write, and/or other network traffic processing functionalities. In one embodiment, the data processing pipeline is part of hardware and, in one embodiment, it is part of an Application-Specific Integrated Circuit (ASIC).

As described above, a problem with having a data processing pipeline in hardware is that configuring of the data pipeline processing is performed when the associated hardware for the data processing pipeline is manufactured. Thus, it is impossible to add, delete, modify, or re-order the pipeline functionality with such a fixed ASIC data processing pipeline after the ASIC is manufactured. For example and in one embodiment, a customer may wish to add new functionality to the data processing pipeline, such as adding a network address translation (NAT) to the data processing pipeline after the network element has been deployed. Alternatively, a customer may wish to remove IPv4 processing and increase the tables for IPv6 in the case where the network element has been deployed in an IPv4 environment that is being converted to an IPv6 environment. In one embodiment, the hardware forwarding engine 200 includes a re-programmable data processing pipeline that can be used to add, delete, modify, or re-order the pipeline functionality of the data processing pipeline. In one embodiment, the data processing pipeline 202 is programmed by the contents of the memory 208 that is used to control the type and ordering of functionality of the data processing pipeline. In this embodiment, by having a re-programmable data processing pipeline, the network data processing can be modified after the network element has been deployed. In one embodiment, the memory 208 is part of a local memory for the data processing pipeline 202.

Figure 3:
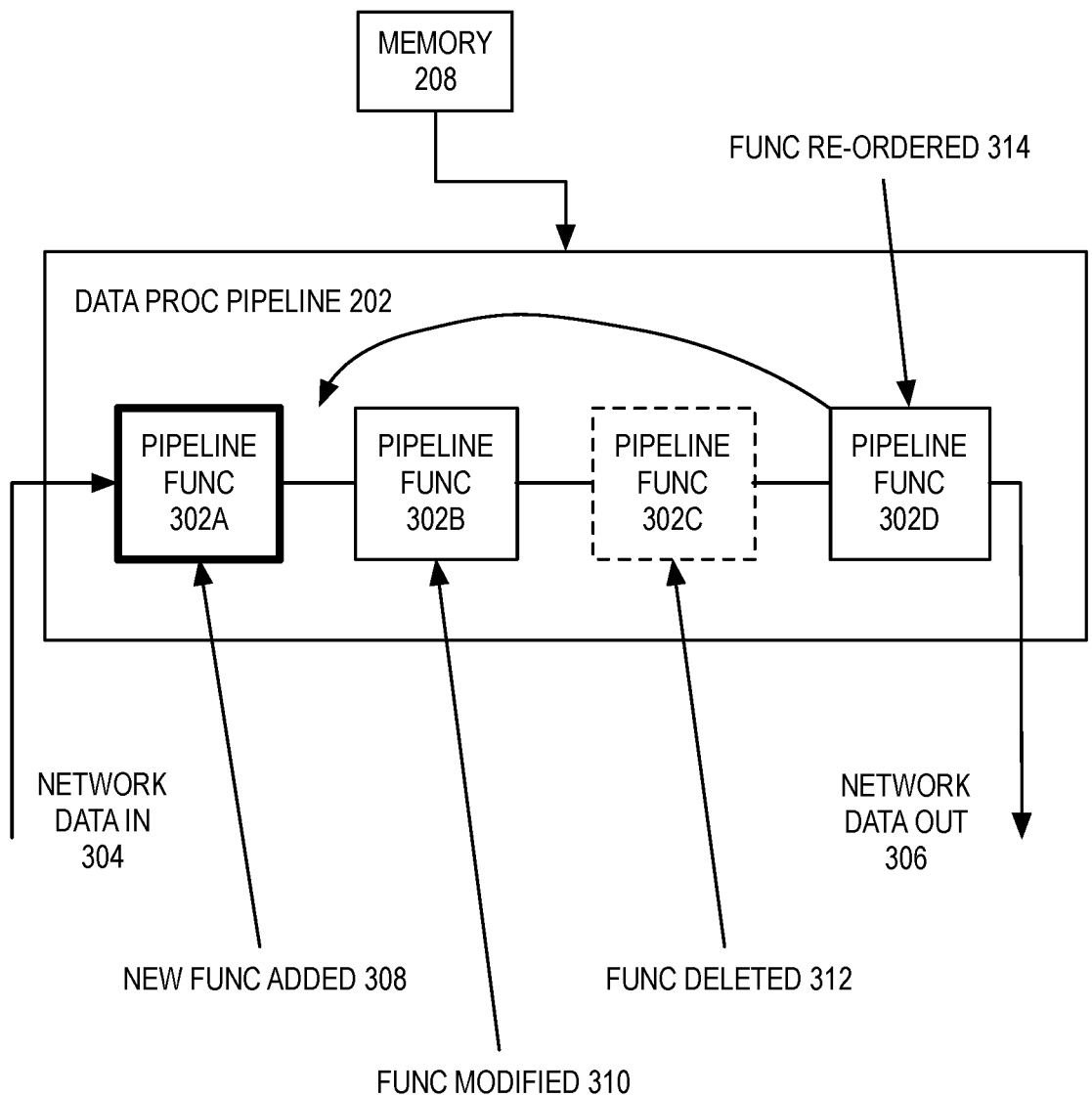
FIG. 3 is a block diagram of one embodiment of a data processing pipeline with re-programmable pipeline functionalities.

FIG. 3 is a block diagram of one embodiment of a data processing pipeline 202 with re-programmable pipeline functionalities. In FIG. 3, the data processing pipeline 202 includes several functionalities that can each perform one or more different actions on the network data processed by the data processing pipeline 202. In one embodiment, the data processing pipeline 202 is coupled to memory 208 that includes contents used to program the data processing pipeline 202. In this embodiment, the contents of the memory define the operations or actions of the pipeline. In one embodiment, the data processing pipeline 202 includes pipeline functionalities 302A-D. In one embodiment, the pipeline functionalities 302A-D can be processed serially, in parallel, or in a combination thereof. While in one embodiment, the data processing pipeline 202 is illustrated with four pipeline functionalities 302A-D, in alternate embodiments, the data processing pipeline can have more or less numbers of pipeline functionalities.

In one embodiment, because the data processing pipeline 202 can be programmed by the contents of the memory 208, the pipeline functionalities of the data processing pipeline can be added to, deleted, modified, or re-ordered. In this embodiment, a new pipeline functionality can be added at the beginning of the data processing pipeline, at end of somewhere in the middle. Adding a new pipeline functionality can add one or more new functionalities to the data processing pipeline. For example and in one embodiment, pipeline functionality 302A is added (308), which can add a NAT functionality to the data processing pipeline (if pipeline stage 302A gives a NAT functionality). In addition, an existing pipeline functionality can be deleted, which removes the functionality of this pipeline functionality from the data processing pipeline. For example and in one embodiment, pipeline functionality 302D is deleted (312) because a customer wants to remove this functionality. Furthermore, an existing pipeline functionality can be modified (e.g. a table of this pipeline functionality can be enlarged or shrunken). Modifying a pipeline functionality can modify the functionality of that pipeline stage. In the example of increasing a table size for a pipeline stage, increasing the table size can mean the functionality (e.g., routing) can handle more stored information (e.g., an increased number of stored routes). For example and in one embodiment, pipeline functionality 302B is modified (310). An existing can also be re-ordered, where one pipeline functionality is moved from one position in the data processing pipeline 202 to another position. For example and in one embodiment, pipeline functionality 302D is re-ordered so as to be in the middle of pipeline functionalities 302A and 302B.

In one embodiment, the data processing pipeline 202 is re-programmed hitlessly by preparing a new image for the data processing pipeline 202, putting the data processing pipeline 202 in a non-forwarding mode, writing the new image to the memory 208, and putting the data processing pipeline 202 in a forwarding mode. In this embodiment, when the data processing pipeline 202 is in a non-forwarding mode, network data is buffered by the network element and not necessarily dropped. For example and in one embodiment, if there is room in the buffers of the network element, network data received by the network element can be stored for processing by the data processing pipeline 202 when the data processing pipeline 202 is put back into forwarding mode. In one embodiment, a hitless action to a network element is an action that allows the layer-1 (L1) connections (e.g. PHYS connections) of the network element to other network elements and/or devices to remain up and active. By having the L1 up and active, the network element appears functioning to other network elements and/or devices coupled to this network element. If, on the other hand, the L1 connections of a network element go down, that network element will appear down to other network elements and these network elements make take one or more actions to compensate (e.g., update forwarding tables, re-route network services, update load balancing of services, and/or types of network updates). This can cause churn in the network, where a hitless action avoids these problems.

In one embodiment, this is a hitless re-programming of the data processing pipeline 202 because the data plane and the control plane of the network element are up and running during the re-programming of the data processing pipeline 202. In other words, the re-programming of the data processing pipeline 202 occurs without restarting the data plane or the network element itself. In one embodiment, a hitless re-programming of the data processing pipeline 202 can take on the order of one second or less time. In this embodiment, by re-programming the data processing pipeline hitlessly, there is little or no churn in the network due to loss of a network element or a network element data plane from a restart of the network element or the data plane of a network element.

In one embodiment, an ASIC can include one or more data processing pipelines and a network element can have multiple ASICs. In this embodiment, the data processing pipelines of a network element can be programmed the same or differently. For an ASIC with multiple data processing pipelines, these data processing pipelines can be programmed with the same or different images, such that these date processing pipelines have the same or different functionalities, or the same functionalities, but in different orders. The data processing pipelines of the network element can be updated concurrently, at different times, using the same or different images.

Figure 4:
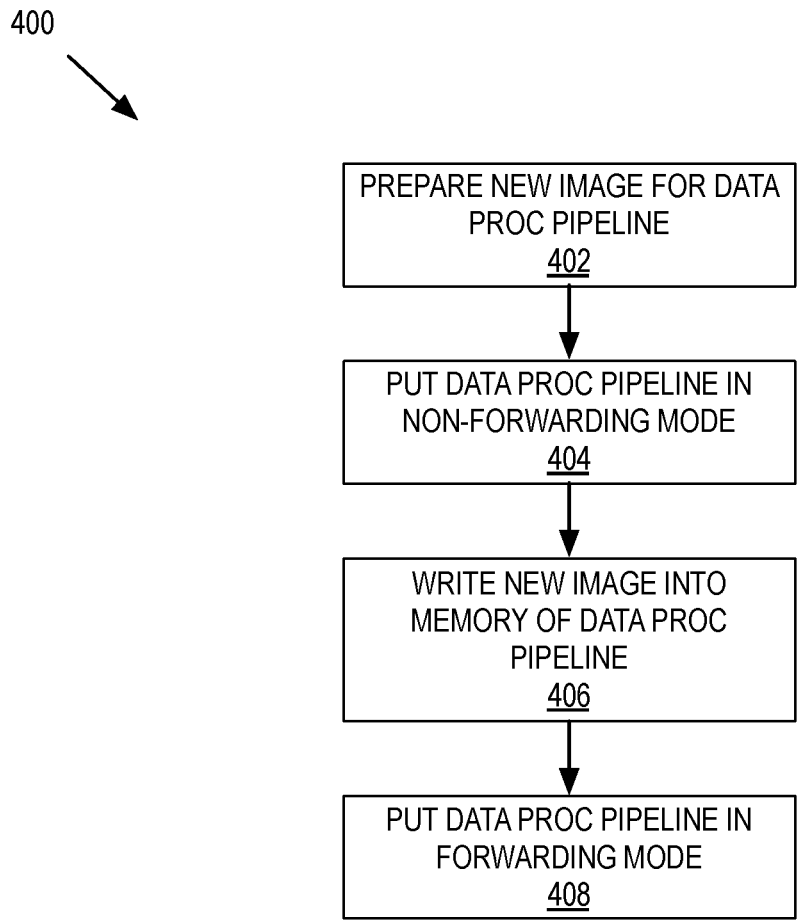
FIG. 4 is flow diagram of one embodiment of a process to perform a hitless re-programming of the pipeline functionalities of the data processing pipeline.

FIG. 4 is flow diagram of one embodiment of a process 400 to perform a hitless re-programming of the pipeline functionalities of the data processing pipeline. In one embodiment, process 400 is performed by a data processing pipeline module that performs a hitless re-configuration of the pipeline functionalities of the data processing pipeline, such as the data processing pipeline module 116 as described in FIG. 1 above. In FIG. 4, process 400 begins by preparing a new image for the data processing pipeline at block 402. In one embodiment, the new image can be prepared by retrieving an image from storage, computing a new image based on at least customer input, retrieving or receiving the new image from another device (e.g., a network management station, controller, or another type of device that can compute or store data processing pipeline images). In one embodiment, there can be multiple data processing pipeline images that a customer can choose from. In one embodiment, the new image is used to re-program the data processing pipeline, as the contents of the new image, when stored in the memory of the data processing pipeline, define the actions and/or operations of the data processing pipeline. At block 404, process 400 puts the data processing pipeline in a non-forwarding mode. In one embodiment, in a non-forwarding mode, the data processing pipeline buffers the incoming network data but does not process this buffered network data. In this mode, the network element continues to receive network data, but does not process the data. In another embodiment, in a non-forwarding mode, the data processing pipeline drops the incoming network data. In this embodiment, even though the incoming network data is dropped, the network element maintains the L1 connections to other coupled network elements and/or devices.

Process 400 writes the new image into the memory of the data processing pipeline at block 406. In one embodiment, by writing the new image into the data processing pipeline memory, the data processing pipeline is re-programmed. At block 408, process 400 puts the data processing pipeline into a forwarding mode. In one embodiment, by putting the data processing pipeline into the forwarding mode, the data processing pipeline processes incoming network data using the new re-programmed functionality from the new image. In one embodiment, the data processing pipeline processes the network data using the re-programmed data processing pipeline.

Figure 5A:
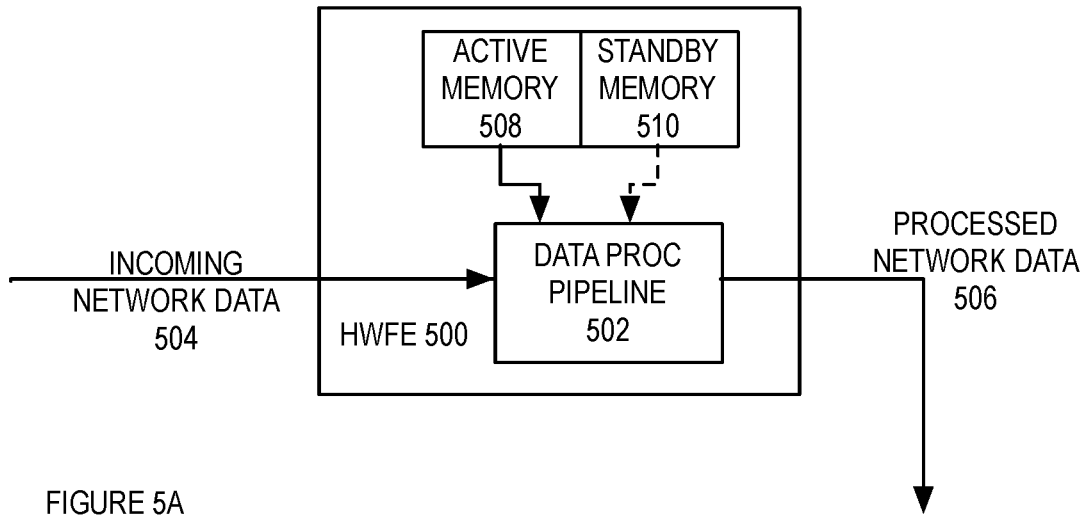
FIGS. 5A-B are block diagrams of embodiments of a data processing pipeline with re-programmable functionalities using standby memory.

As described above, in another embodiment, the network element can re-program the data processing pipeline using a standby memory region. FIG. 5A is a block diagram of one embodiment of a data processing pipeline with re-programmable functionalities using standby memory. In FIG. 5A, the hardware forwarding engine 500 includes a data processing pipeline 502, an active memory 508, and a standby memory 510. In one embodiment, the hardware forwarding engine 500 receives the incoming network data 504, processes the incoming network data 504 using data processing pipeline 502, and outputs the processed network data 506. In this embodiment, the data processing pipeline 502 processes the incoming network data using one or more functionalities of the pipeline as described in FIG. 3 above. In one embodiment, the active memory 508 and standby memory 510 are part of a local memory of the data processing pipeline 502.

In one embodiment, instead of putting the data processing pipeline 502 into a non-forwarding mode in order to re-program the data processing pipeline as described in FIGS. 3 and 4, the hardware forwarding engine 500 includes two memories, an active memory 508 and a standby memory 510. In one embodiment, the active memory 508 is used to program the data processing pipeline that processes the incoming network data 504. In this embodiment, in order to re-program the data processing pipeline 502, the network element prepares a new image for the data processing pipeline 502, where the new image includes data that is used to program the functionalities of the data processing pipeline 502 as described in FIG. 3 above. To re-program the data processing pipeline, and in one embodiment, the network element has the data processing pipeline read the new image from the standby memory 510, which re-programs the functionalities of the data processing pipeline 502. In one embodiment, the data processing pipeline 502 is re-programmed by the data processing pipeline 502 starting to use the new image in the standby memory 510. In this embodiment, the amount of time where the data processing pipeline 502 is not processing the incoming network data 504 is less than that putting the data processing pipeline into a non-forwarding mode as described in FIG. 2 above. With the new image programmed for the data processing pipeline 502, the standby memory 510 is the new active memory and the former active memory 508 can be used as standby memory if the data processing pipeline 502 is to be re-programmed again.

Figure 5B:
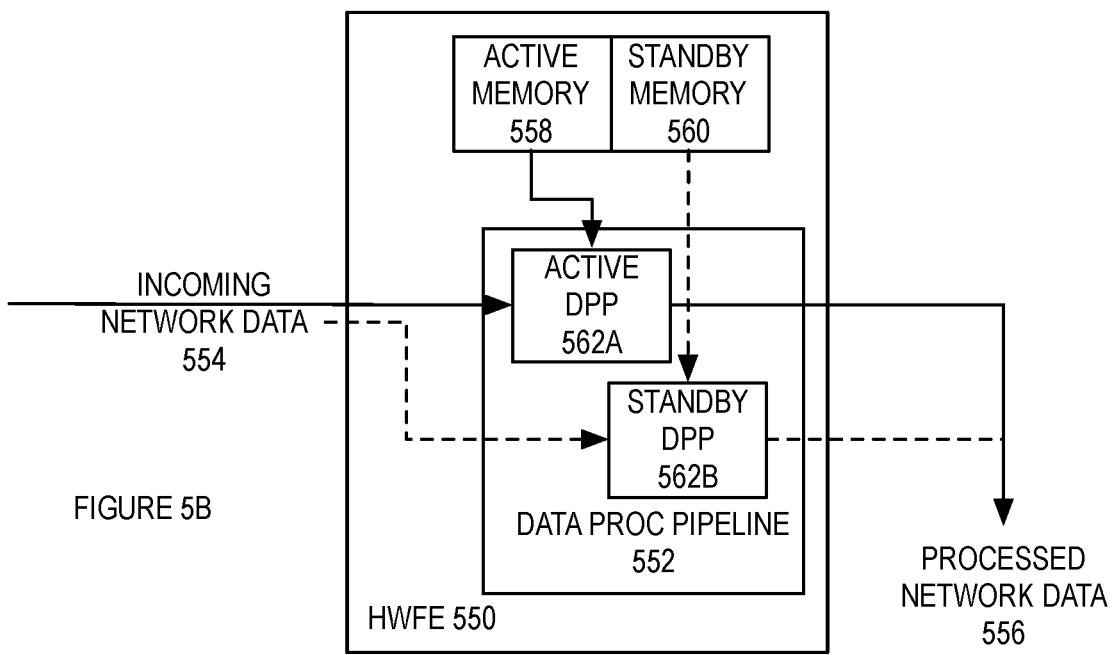

In a further embodiment, the data processing pipeline can include two different pipelines, an active data processing pipeline and a standby processing pipeline. In this embodiment, the standby data processing pipeline can be programmed using a standby memory. In one embodiment, the standby data processing pipeline can be programmed using a standby memory while the active data processing pipeline is processing the incoming network data. FIG. 5B is a block diagram of one embodiment of a data processing pipeline with re-programmable functionalities using standby memory. In FIG. 5B, the hardware forwarding engine 550 includes a data processing pipeline 552, an active memory 558, and a standby memory 560, where the data processing pipeline 552 includes an active data processing pipeline 562A and a standby data processing pipeline 562B. In one embodiment, the active memory 558 and standby memory 560 are part of a local memory of the data processing pipeline 552.

In one embodiment, the hardware forwarding engine 550 receives incoming network data 504, processes the incoming network data 554 using the active data processing pipeline 562A, and outputs the processed network data 556. In this embodiment, the active data processing pipeline 562A processes the incoming network data using one or more functionalities of the pipeline as described in FIG. 3 above. In this embodiment, to change the functionalities of data processing pipeline, the standby data processing pipeline 562B is re-programmed by writing a new image to the standby memory region 560 and having the standby data processing pipeline 562B read the contents of the standby memory region 560 that is used to program the standby data processing pipeline 562B. In this embodiment, the amount of downtime where the data processing pipeline 502 is not processing the incoming network data 504 is less than that putting the data processing pipeline into a non-forwarding mode as described in FIG. 2 above. With the standby data processing pipeline 562B programmed with the new image, the standby data processing pipeline 562B is ready to process the incoming network data 554. In one embodiment, the standby data processing pipeline 562B is generated in response to the writing of the new image to the memory for the standby data processing pipeline. The network element changes the flow of incoming network data 554 to be processed using the standby data processing pipeline 562B with the new functionalities of the new image instead of the active data processing pipeline 562A. By changing the flow of network data to be processed with the standby data processing pipeline 562B, the standby data processing pipeline 562B becomes the new active data processing pipeline and the former active data processing pipeline 562A becomes the new standby data processing pipeline. In addition, the standby memory 560 becomes the new active memory and the former active memory 558 is the new standby memory. In one embodiment, the new standby memory can be used to re-program the new standby data processing pipeline. In this embodiment, by switching the incoming network data processing 554 from the active data processing pipeline 562A to a programmed standby data processing pipeline 562B, the amount of downtime where the data processing pipeline 552 is not processing the incoming network data 554 is less than that putting the data processing pipeline into a non-forwarding mode as described in FIG. 2 above or even using the standby and active memories as described in FIG. 5A above.

Figure 6A:
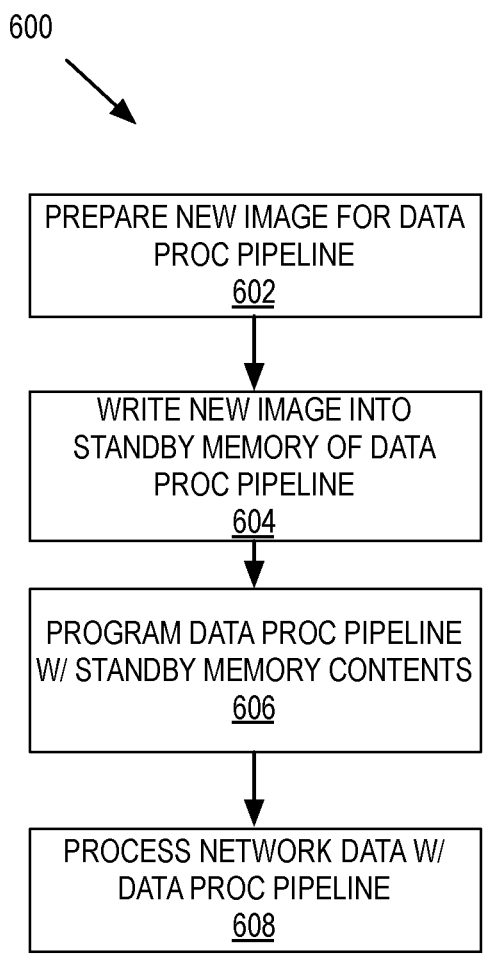
FIGS. 6A-B are flow diagrams of embodiment of a process to perform a hitless re-programming of the pipeline functionalities of the data processing pipeline using standby memory.
Figure 6B:
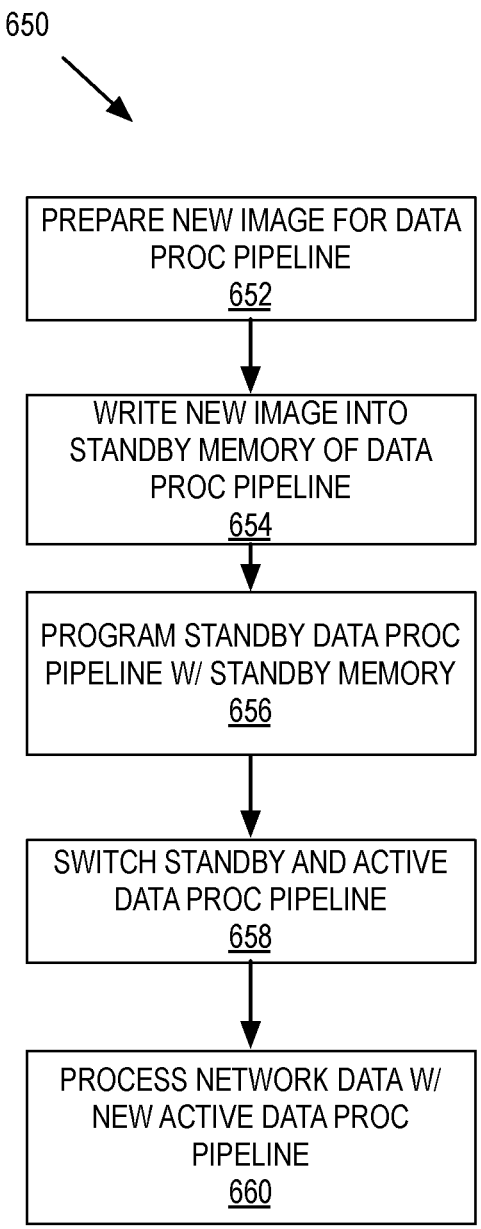

FIGS. 6A-B are flow diagrams of embodiment of a process to perform a hitless re-programming of the pipeline functionalities of the data processing pipeline using standby memory. FIG. 6A is one embodiment of a process 600 to perform a hitless re-programming of the pipeline functionalities of the data processing pipeline using standby memory. In one embodiment, process 600 is performed by a data processing pipeline module that performs a hitless re-configuration of the pipeline functionalities of the data processing pipeline using a standby memory, such as the data processing pipeline module 116 as described in FIG. 1 above. In FIG. 6A, process 600 begins by preparing a new image for the data processing pipeline at block 602. In one embodiment, the new image can be prepared by retrieving an image from storage, computing a new image based on at least customer input, retrieving or receiving the new image from another device (e.g., a network management station, controller, or another type of device that can compute or store data processing pipeline images). In one embodiment, there can be multiple data processing pipeline images that a customer can choose from. In one embodiment, the new image is used to re-program the standby data processing pipeline, as the contents of the new image, when stored in the standby memory of the standby data processing pipeline, define the actions and/or operations of the standby data processing pipeline.

At block 604, process 600 writes the new image into a standby memory of the data processing pipeline. In one embodiment, the standby memory region is a different memory region for the data processing pipeline than the active memory region that is current programming the data processing pipeline. For example and in one embodiment, the standby memory region is the standby memory region 510 as described in FIG. 5A above. Process 600 programs the data processing pipeline using the contents of the standby memory at block 606. In one embodiment, process 600 programs that data processing pipeline by switching a pointer that was pointing to the active memory region to point to the standby memory region. By switching the pointer, the data processing pipeline reads the new image in the standby memory region and uses the contents of the standby memory regions for processing the received network data. In addition, by switching to the standby memory region to program the data processing pipeline to process the received network data, the standby memory region becomes the active memory region and the active memory region is the standby memory, which can be used to further re-program the data processing pipeline at a later date. Process 600 processes the received network data using the data processing pipeline with the functionalities programmed by the contents of the new image at block 608.

In FIG. 6A, process 600 programs the data processing pipeline using two different regions of the memory for the data processing pipeline. In this embodiment, the data processing pipeline is re-programmed by the data processing pipeline starting to use the new image in the standby memory. In a further embodiment, the data processing pipeline includes an active and standby data processing pipeline. In this embodiment, each of the active and standby data processing pipeline is associated with a different memory region that is used to program the relevant data processing pipeline. FIG. 6B is one embodiment of a process 650 to perform a hitless re-programming of the pipeline functionalities of the data processing pipeline using standby data processing pipeline. In one embodiment, process 650 is performed by a data processing pipeline module that performs a hitless re-configuration of the pipeline functionalities of the data processing pipeline using standby data processing pipeline, such as the data processing pipeline module 116 as described in FIG. 1 above. In FIG. 6B, process 650 begins by preparing a new image for the data processing pipeline at block 652. In one embodiment, the new image can be prepared by retrieving an image from storage, computing a new image based on at least customer input, retrieving or receiving the new image from another device (e.g., a network management station, controller, or another type of device that can compute or store data processing pipeline images). In one embodiment, there can be multiple data processing pipeline images that a customer can choose from. In one embodiment, the new image is used to re-program the standby data processing pipeline, as the contents of the new image, when stored in the standby memory of the standby data processing pipeline, define the actions and/or operations of the standby data processing pipeline, when the standby data processing pipeline becomes the active data processing pipeline and processes the incoming network data.

At block 654, process 650 writes the new image into a standby memory of the standby data processing pipeline. In one embodiment, the standby memory region is a different memory region used for the standby data processing pipeline than the active memory region that is currently programmed the active data processing pipeline. For example and in one embodiment, the standby memory region is the standby memory region 560 as described in FIG. 5B above. Process 650 programs the standby data processing pipeline using the contents of the standby memory at block 656. In one embodiment, the standby data processing pipeline is re-programmed by the standby data processing pipeline starting to use the new image in the standby memory.

At block 658, process 650 switches the active and standby data processing pipelines such that standby data processing pipeline is the new active data processing pipeline that processes the incoming network data. In addition, the former active data processing pipeline is the new standby data processing pipeline that can be re-programmed at a later time. In addition, the network changes the flow of incoming network data to be processed by the new active data processing pipeline. Process 600 processes the received network data using the new active data processing pipeline (e.g., the former standby data processing pipeline) with the functionalities programmed by the contents of the new image at block 660.

Figure 7:
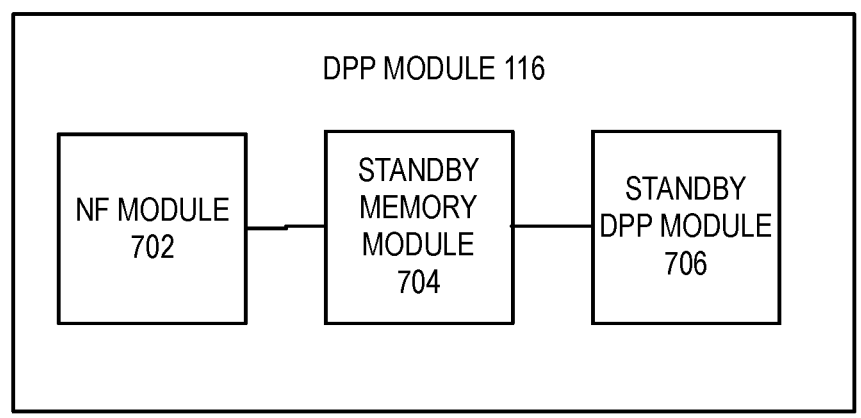
FIG. 7 is a block diagram of one embodiment of a data processing pipeline module that performs a hitless re-programming of the pipeline functionalities of the data processing pipeline.

FIG. 7ABC are block diagrams of one embodiment of a data processing pipeline module 116 that performs a hitless re-programming of the pipeline functionalities of the data processing pipeline. In one embodiment, the data processing pipeline module 116 includes non-forwarding module 702, standby memory module 704, and a standby data processing pipeline module 706. In one embodiment, the data processing pipeline 116 uses one or more of these modules 702, 704, or 706 to re-program the data processing pipeline. In one embodiment, the non-forwarding module 702 re-programs the data processing pipeline using a non-forwarding mode as described in FIG. 4 above. The standby memory module 704 re-programs the data processing pipeline using a standby memory as described in FIG. 6A above. The standby data processing pipeline module 706 re-programs the data processing pipeline as described in FIG. 6B above.

Figure 8:
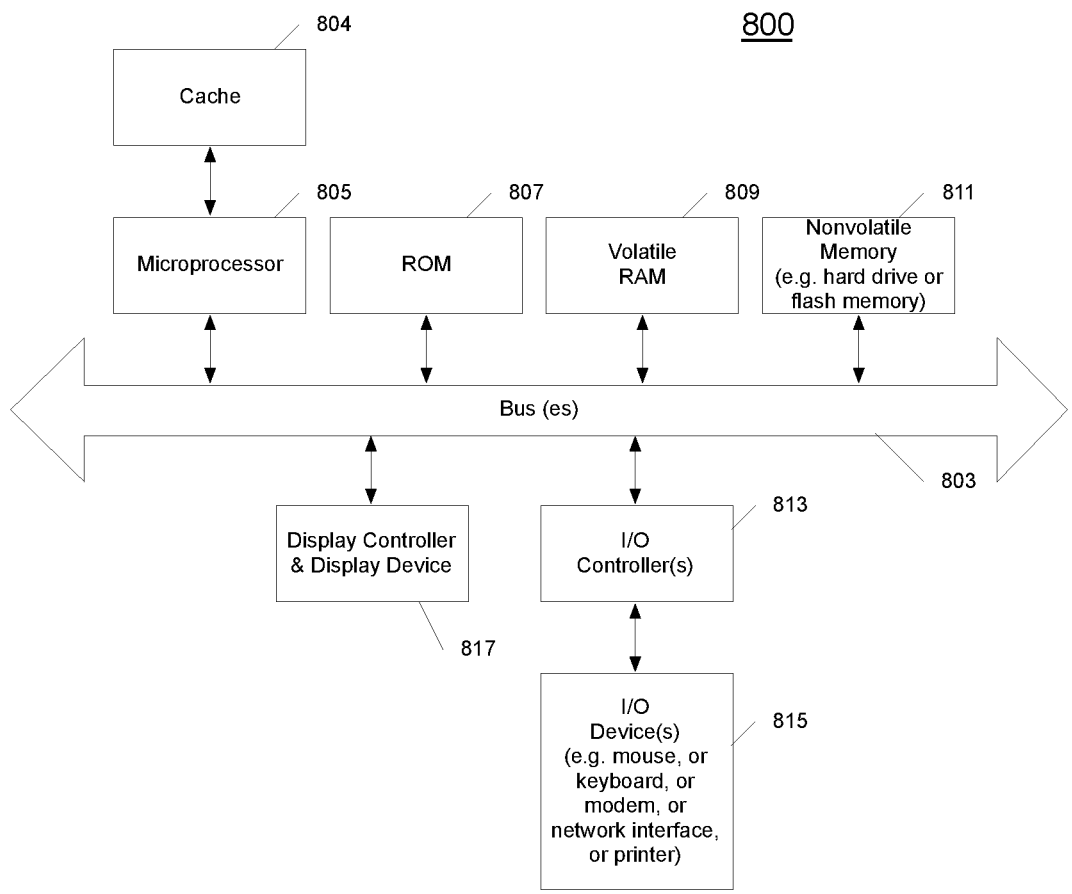
FIG. 8 illustrates one example of a typical computer system, which may be used in conjunction with the embodiments described herein.

FIG. 8 shows one example of a data processing system 800, which may be used with one embodiment of the present invention. For example, the system 800 may be implemented as a network element, including a network element 100 as shown in FIG. 1. Note that while FIG. 8 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 8, the computer system 800, which is a form of a data processing system, includes a bus 803 which is coupled to a microprocessor(s) 805 and a ROM (Read Only Memory) 807 and volatile RAM 809 and a non-volatile memory 811. The microprocessor 805 may retrieve the instructions from the memories 807, 809, 811 and execute the instructions to perform operations described above. The bus 803 interconnects these various components together and also interconnects these components 805, 807, 809, and 811 to a display controller and display device 817 and to peripheral devices such as input/output (I/O) devices which may be mice, keyboards, modems, network interfaces, printers and other devices which are well known in the art. In one embodiment, the system 800 includes a plurality of network interfaces of the same or different type (e.g., Ethernet copper interface, Ethernet fiber interfaces, wireless, and/or other types of network interfaces). In this embodiment, the system 800 can include a forwarding engine to forward network date received on one interface out another interface.

Typically, the input/output devices 815 are coupled to the system through input/output controllers 813. The volatile RAM (Random Access Memory) 809 is typically implemented as dynamic RAM (DRAM), which requires power continually in order to refresh or maintain the data in the memory.

The mass storage 811 is typically a magnetic hard drive or a magnetic optical drive or an optical drive or a DVD ROM/RAM or a flash memory or other types of memory systems, which maintains data (e.g. large amounts of data) even after power is removed from the system. Typically, the mass storage 811 will also be a random-access memory although this is not required. While FIG. 8 shows that the mass storage 811 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus, processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 9:
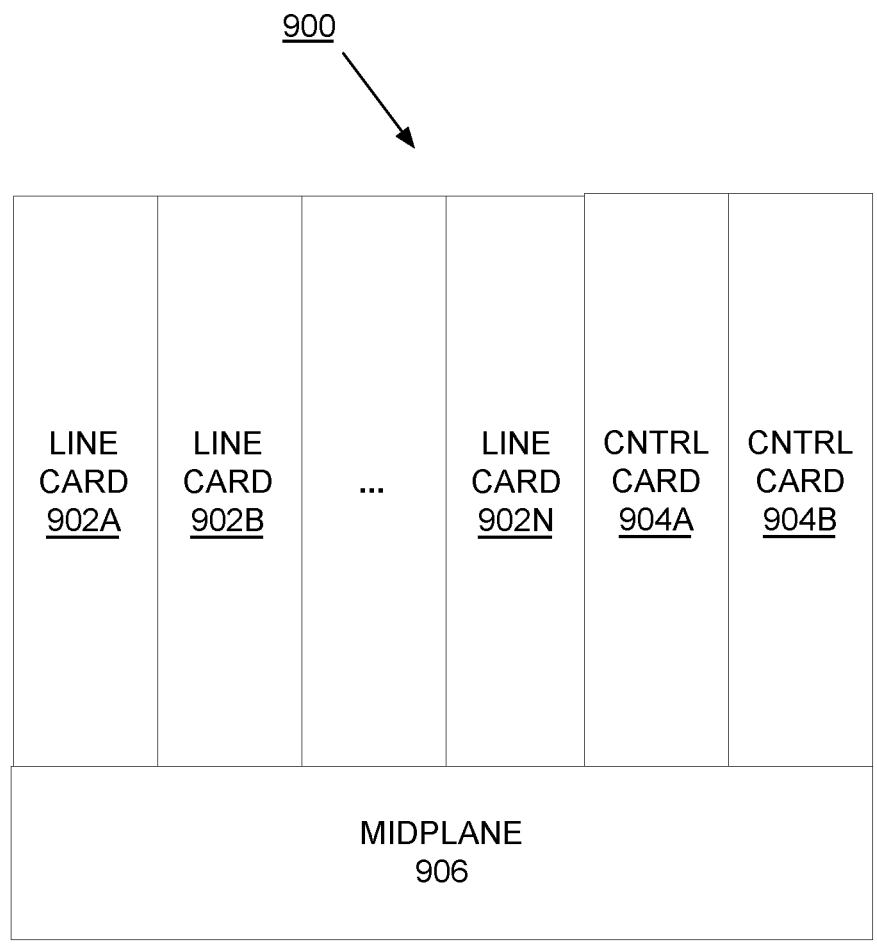
FIG. 9 is a block diagram of one embodiment of an exemplary network element that performs a hitless re-programming of the pipeline functionalities of the data processing pipeline.

FIG. 9 is a block diagram of one embodiment of an exemplary network element 900 that performs a hitless re-programming of the pipeline functionalities of the data processing pipeline. In FIG. 9, the midplane 906 couples to the line cards 902A-N and controller cards 904A-B. While in one embodiment, the controller cards 904A-B control the processing of the traffic by the line cards 902A-N, in alternate embodiments, the controller card 904A-B, perform the same and/or different functions (e.g., performs a hitless re-configuration of the pipeline functionalities of the data processing pipeline as described in FIGS. 3-6AB above). In one embodiment, the line cards 902A-N processes network data. It should be understood that the architecture of the network element 900 illustrated in FIG. 9 is exemplary, and different combinations of cards may be used in other embodiments of the invention.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "preparing," "putting," "writing," "storing," "processing," "performing," "configuring," "programming," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to process data by a network element with a data processing pipeline, the method comprising:
   preparing a new image for the data processing pipeline of the network element, wherein the data processing pipeline processes network data received by the network element and the new image modifies one or more functionalities of the data processing pipeline;
   putting the data processing pipeline into a non-forwarding mode;
   writing the new image into memory of the data processing pipeline; and
   putting the data processing pipeline into a forwarding mode, wherein the data processing pipeline processes network data received by the network element using the new image.

2. The machine-readable medium of claim 1, wherein a modification of the one or more functionalities of the data processing pipeline is selected from the group consisting of adding a new functionality to the data processing pipeline, deleting an existing functionality of the data processing pipeline, changing an existing functionality of the data processing pipeline, and re-ordering a functionality of the data processing pipeline.

3. The machine-readable medium of claim 2, wherein the changing the existing functionality of the data processing pipeline includes modifying a table size of the existing functionality.

4. The machine-readable medium of claim 2, wherein the addition of the new functionality is selected from the group consisting of an add to the beginning of a pipeline of the data processing pipeline, an add to the end of the pipeline, and an add to an intermediary position of the data processing pipeline.

5. The machine-readable medium of claim 2, wherein the deletion of the existing functionality is selected from the group consisting of a deletion to the beginning of a pipeline of the data processing pipeline, a deletion to the end of the pipeline, and a deletion of an intermediary functionality of the data processing pipeline.

6. The machine-readable medium of claim 1, wherein the network element includes a control plane and a data plane and the data processing pipeline is part of the data plane.

7. The machine-readable medium of claim 6, wherein the preparing of the new image and the writing of the new image is managed by the control plane.

8. The machine-readable medium of claim 1, wherein the network element includes a plurality of data processing pipelines and each of the plurality of data processing pipeline can have the new image written into memory of the plurality of data processing pipelines.

9. The machine-readable medium of claim 1, wherein the data processing pipeline is an Application-Specific Integrated Circuit.

10. The machine-readable medium of claim 1, wherein when the data processing pipeline is in the non-forwarding mode, network data received by the network element is buffered.

11. The machine-readable medium of claim 1, wherein when the data processing pipeline is in the non-forwarding mode, the network data received by the network element for the data processing pipeline is dropped.

12. The machine-readable medium of claim 1, wherein the data processing pipeline is in the non-forwarding mode for 1 second or less.

13. A method to process data by a network element with a data processing pipeline, the method comprising:
   preparing a new image for the data processing pipeline of the network element, wherein the data processing pipeline processes network data received by the network element and the new image modifies one or more functionalities of the data processing pipeline;
   putting the data processing pipeline into a non-forwarding mode;
   writing the new image into memory of the data processing pipeline; and
   putting the data processing pipeline into a forwarding mode, wherein the data processing pipeline processes network data received by the network element using the new image.

14. The method of claim 13, wherein a modification of the one or more functionalities of the data processing pipeline is selected from the group consisting of adding a new functionality to the data processing pipeline, deleting an existing functionality of the data processing pipeline, changing an existing functionality of the data processing pipeline, and re-ordering a functionality of the data processing pipeline.

15. The method of claim 14, wherein the changing the existing functionality of the data processing pipeline includes modifying a table size of the existing functionality.

16. The method of claim 14, wherein the addition of the new functionality is selected from the group consisting of an add to the beginning of a pipeline of the data processing pipeline, an add to the end of the pipeline, and an add to an intermediary position of the data processing pipeline.

17. The method of claim 14, wherein the deletion of the existing functionality is selected from the group consisting of a deletion to the beginning of a pipeline of the data processing pipeline, a deletion to the end of the pipeline, and a deletion of an intermediary functionality of the data processing pipeline.

18. The method of claim 13, wherein when the data processing pipeline is in the non-forwarding mode, network data received by the network element is buffered.

19. The method of claim 13, wherein when the data processing pipeline is in the non-forwarding mode, network data received by the network element for the data processing pipeline is dropped.

20. A network element that processes network data with a data processing pipeline, the network element comprises:
   a port that receives incoming network data;
   a data plane that includes a data processing pipeline that processes the network data;
   memory that stores a new image for the data processing pipeline; and
   a control plane that prepares the new image for the data processing pipeline of the network element, puts the data processing pipeline into a non-forwarding mode, writes the new image into the memory, and puts the data processing pipeline into a forwarding mode, wherein the new image modifies one or more functionalities of the data processing pipeline and the data processing pipeline processes network data received by the network element using the new image.

* * * * *